(No Model.)

G. F. SIMONDS.
BALL BEARING.

No. 449,955. Patented Apr. 7, 1891.

Witnesses.

Inventor.
George F. Simonds.
By James L. Norris.
Atty.

UNITED STATES PATENT OFFICE.

GEORGE F. SIMONDS, OF FITCHBURG, MASSACHUSETTS.

BALL-BEARING.

SPECIFICATION forming part of Letters Patent No. 449,955, dated April 7, 1891.

Application filed August 2, 1890. Serial No. 360,807. (No model.)

*To all whom it may concern:*

Be it known that I, GEORGE FREDERICK SIMONDS, a citizen of the United States, residing at Fitchburg, in the county of Worcester and State of Massachusetts, have invented new and useful Improvements in Ball-Bearings, of which the following is a specification.

This invention relates to that type of ball-bearings wherein annular sets of spherical rollers or balls are employed to sustain or support radial pressure or weight, and other annular sets of similar rollers or balls serve to resist or counteract endwise thrusts of a shaft or journal, as in the several Letters Patent issued to me August 19, 1890.

The object of the present invention is to simplify the former constructions and provide a more economical ball-bearing; and to such ends my invention consists in a shaft or journal, whether stationary or revolving, formed integral with an annular rib or collar having side walls or surfaces arranged at right angles to the axis of the shaft or journal, combined with rings or annular pieces having inwardly-projecting annular ribs or collars, annular sets of spherical rollers or balls located between the shaft or journal, and the rings or annular pieces to sustain or support radial pressure or weight and resist or counteract endwise thrusts of the shaft or journal, as will be more fully hereinafter described.

Figure 1:
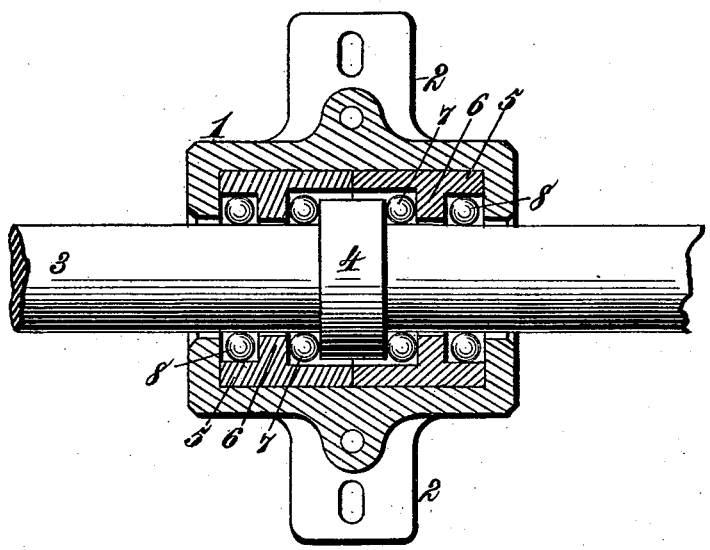
Figure 2:
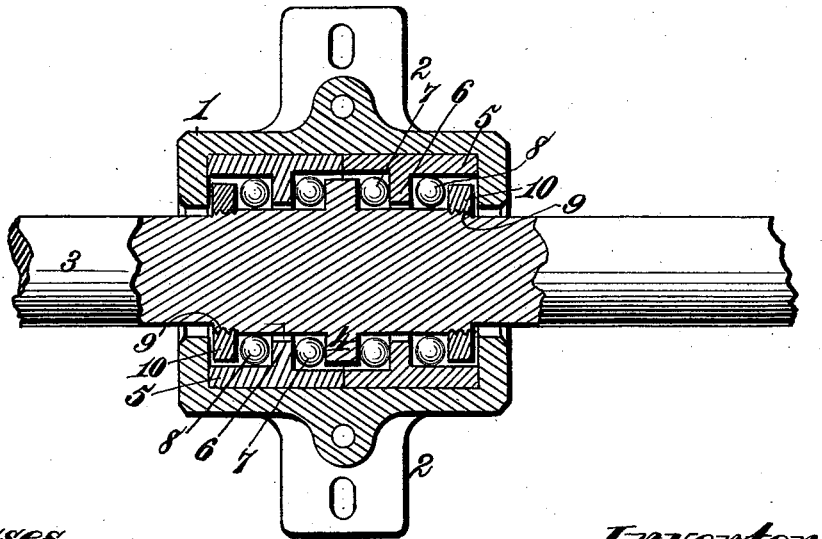

In the accompanying drawings, Figure 1 is a plan view, partly in section, of a ball-bearing constructed in accordance with my invention. Fig. 2 is a similar view showing a modification.

In order to enable those skilled in the art to make and use my invention, I will now describe the same in detail, referring to Fig. 1, where the numeral 1 indicates the lower section or half of a box, having flanges 2 or otherwise constructed to be secured in a stationary position on a suitable support. In practice the upper section or half of the box is of a like construction, except as to the flanges, and is adapted to be secured by bolts or similar fastenings to the lower section in the usual manner. The cylindrical shaft or journal 3 is formed integral with an annular rib or collar 4, having its side walls or surfaces arranged at right angles to the axis of the shaft or journal, and at each side of this rib or collar is placed a ring or annular piece 5, formed or provided with an inwardly-projecting rib or collar 6. These rings or annular pieces are adapted to accurately fit into the box and abut each other at their inner edges. In the circular spaces or channels between the rib or collar 4 on the shaft or journal and the ribs or collars 6 on the annular pieces are arranged two annular sets of spherical rollers or balls 7, which bear against the parallel surfaces of the ribs or collars, the construction being such that these annular sets of spherical rollers or balls operate to resist or counteract endwise thrusts of the shaft or journal. In the annular channels between the ribs or collars 6 of the rings or annular pieces and the end walls of the box 1 are arranged annular sets of spherical rollers or balls 8, which have no pressure-supporting contact with the end walls of the box or the ribs or collars of the rings or annular pieces, but have a pressure-supporting contact with the shaft or journal and the internal surfaces of the rings or annular pieces in such manner that the annular sets of spherical rollers or balls 8 operate to sustain or support radial pressure or weight.

In the modification shown in Fig. 2 the construction is the same as described with reference to Fig. 1; but in the modification the shaft or journal is slightly enlarged to form the bearing-surfaces for the annular sets of spherical rollers or balls, and the end portions of this enlargement are cut with screw-threads, as at 9, to receive screw-threaded rings 10, which serve to retain the end sets or annular rollers or balls in their proper channels, and serve by their adjustment to compensate for wear, if such requirement should be essential.

By the construction described and shown a durable, efficient, and economical ball-bearing is produced which fulfills all the conditions required for reducing friction.

It will be obvious that instead of the shaft or journal rotating it may stand stationary, while the box and its contained rings or annular pieces may be constructed to revolve on the shaft or journal. The rib or collar 4 can be formed as an integral part of the shaft or journal in any proper manner—as, for example, by winding a circular band of metal on the shaft or journal in a manner well known to those skilled in the art.

Having thus described my invention, what I claim is—

A ball-bearing comprising a shaft or journal formed integral with an annular rib or collar, rings or annular pieces having inwardly-projecting ribs or collars, annular sets of spherical rollers or balls operating to sustain or support radial pressure or weight, and other sets of spherical rollers or balls to resist or counteract endwise thrusts of the shaft or journal, said annular sets of rollers or balls which resist endwise thrusts being arranged between the annular sets of spherical rollers or balls which sustain or support radial pressure or weight, and located at opposite sides and rolling in contact with the side walls or surfaces of the rib or collar on the shaft, substantially as described.

In testimony whereof I have affixed my signature in presence of two witnesses.

GEO. F. SIMONDS.

Witnesses:
JAMES A. RUTHERFORD,
ALBERT H. NORRIS.